Oct. 4, 1927.

R. E. MOELLRING

POULTRY FEED TROUGH

Filed Aug. 16, 1926

1,644,263

Inventor
R. E. Moellring,
By Clarence A. O'Brien
Attorney

Patented Oct. 4, 1927.

1,644,263

UNITED STATES PATENT OFFICE.

RALPH E. MOELLRING, OF CLAYTON, ILLINOIS.

POULTRY-FEED TROUGH.

Application filed August 16, 1926. Serial No. 129,449.

This invention relates to poultry feed troughs and has for its primary object to provide a trough constructed for the reception of a large quantity of feed and also to provide means for permitting the chickens to roost upon the trough so as to gain access to the feed.

A further object of the invention resides in the provision of a trough of this character that is relatively simple of construction and inexpensive of manufacture, the same consisting of but few parts, and these so co-related as to reduce the liability of disarrangement to a minimum.

An additional and important object is to provide means directly above the center of the trough for preventing the roosting of the chickens above the trough, which would otherwise result in the imperfection of the feed by the dropping of waste matter thereon.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts:

Figure 2:
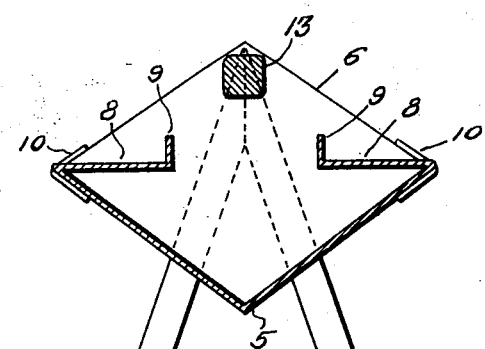
Figure 2 is a detail vertical section thereof.
Figure 3:
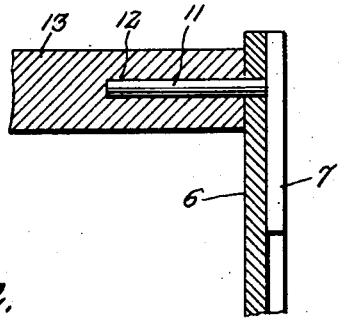
Figure 3 is an enlarged fragmentary longitudinal section through the top side of the trough for more clearly disclosing the means for preventing the roosting of the fowls above the trough.

Now having particular reference to the drawing, my novel feed trough constitutes the provision of a relatively elongated feed hopper 5 that is of general V-formation in cross section as disclosed in Figure 2. At the opposite ends of this hopper are walls 6—6 of general diamond formation as shown.

Suitably secured to these end walls and at the outer sides thereof are depending outwardly converging supporting legs 7—7.

The material forming the hopper 5 is bent inwardly at the side edges thereof for providing horizontal fowl roosts 8—8, the inner edges of which are bent upwardly as at 9—9 for preventing the fowl from walking off of the edges and falling into the feed within the hopper.

Figure 1:
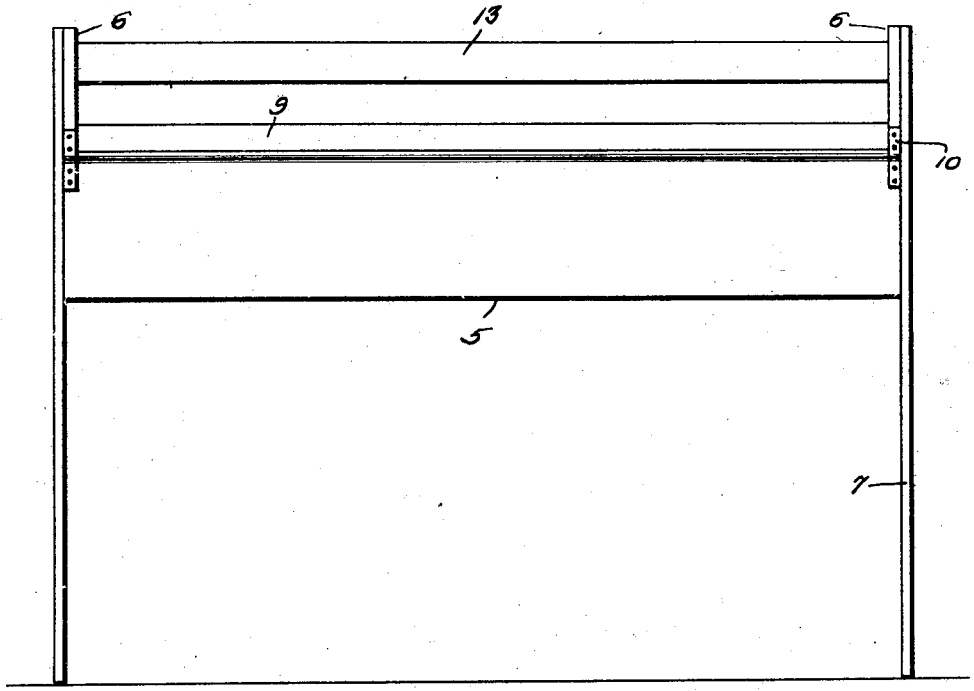
Figure 1 is a side elevation of a feed trough constructed in accordance with the present invention.

As a reinforcement between the end walls 6—6 and the hopper 5, I provide strap irons 10—10 that are so bent as to engage the sides of the hopper and the adjacent edges of said end walls as clearly disclosed in Figures 1 and 2, these strap irons being suitably secured to the walls of the hopper and the end walls 6—6 by nails or other suitable fastening means.

Extending longitudinally inwardly from each end wall 6 adjacent the upper apex thereof is a relatively elongated pin 11 that loosely fits within an elongated socket 12 in the adjacent end of a horizontal cross bar 13, preferably of square shape in cross section. Obviously, should a chicken attempt to roost upon this bar, the same will rotate for preventing such an action.

It will thus be seen that I have provided a highly novel, simple, and efficient form of poultry feeder that is well adapted for all the purposes heretofore designated, and even though I have herein shown and described the invention as consisting of certain detail structural elements, it is nevertheless to be understood that certain changes may be made therein without affecting the spirit and scope of the appended claims.

Having thus described the invention, what I claim as new and desire to secure by Letters Patent is:—

1. In an elevated feed trough of the class described, a relatively elongated hopper open at its top side, relatively long supporting legs secured at their upper ends to the respective end walls of the hopper, relatively wide laterally inwardly extending plates formed on the upper edges of the sides of the hopper and integral therewith for providing a chicken roost, and upwardly directed flanges formed on the inner edges of said plates to provide a guard at the inner side of each roost.

2. In an elevated feed trough of the class described, a relatively elongated hopper of general V-shape in cross section, end walls for said hopper, relatively long supporting legs secured at their upper ends to the respective end walls of the hopper, the upper edge portions of the sides of the V-shaped hopper being directed inwardly and disposed substantially horizontally to provide relatively wide chicken roosts, the inner opposed side edge portions of the roosts being spaced with respect to each other to permit access to the interior of the hopper, and upstanding flanges formed on the inner side edge portions of the roosts providing guards.

In testimony whereof I affix my signature.

RALPH E. MOELLRING.